(12) United States Patent
Pavlou et al.

(10) Patent No.: US 10,394,346 B2
(45) Date of Patent: Aug. 27, 2019

(54) USING A HARDWARE MOUSE TO OPERATE A LOCAL APPLICATION RUNNING ON A MOBILE DEVICE

(71) Applicant: Citrix Systems, Inc., Fort Lauderdale, FL (US)

(72) Inventors: Chris Pavlou, Boca Raton, FL (US); Mukund Ingale, Pompano Beach, FL (US); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 301 days.

(21) Appl. No.: 15/160,047

(22) Filed: May 20, 2016

(65) Prior Publication Data
US 2017/0336883 A1  Nov. 23, 2017

(51) Int. Cl.
*G06F 3/041* (2006.01)
*G06F 3/0488* (2013.01)
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
CPC .... G06F 3/041; G06F 3/0488; G06F 3/03543; G06F 3/038
See application file for complete search history.

(56) References Cited

U.S. PATENT DOCUMENTS

| 9,110,581 B2 | 8/2015 | Momchilov |
| 9,152,436 B2 | 10/2015 | Momchilov |
| 9,514,507 B2 | 12/2016 | McKenzie et al. |
| 9,588,637 B2 | 3/2017 | Momchilov et al. |
| 9,729,520 B2 | 8/2017 | Barton et al. |
| 9,736,221 B2 | 8/2017 | Momchilov et al. |
| 9,760,724 B2 | 9/2017 | Frost |

(Continued)

OTHER PUBLICATIONS

"CN 103472931A ENG.pdf" by Chen, Guanting; a machine English translation version of Chinese Patent Application "CN 103472931 A", published Dec. 25, 2013.*

(Continued)

*Primary Examiner* — Wing H Chow
(74) *Attorney, Agent, or Firm* — BainwoodHuang (57) ABSTRACT

A technique operates a local application running on a mobile device (e.g., a smart phone, a tablet, a personal digital assistant, etc.). The technique involves receiving, by processing circuitry of the mobile device, native mouse input from a hardware mouse communicating with the mobile device. The native mouse input is received in response to user operation of the hardware mouse. The technique further involves translating, by the processing circuitry, the native mouse input into translated touchscreen input. The technique further involves providing, by the processing circuitry, the translated touchscreen input to the local application running on the mobile device to control operation of the local application. With the availability of such a hardware mouse, the mobile device is better suited for running local applications that may require precise user input such as spreadsheets, computer-aided design (CAD) tools, games, and so on.

20 Claims, 6 Drawing Sheets (56) References Cited

U.S. PATENT DOCUMENTS

2011/0109552 A1* 5/2011 Yasutake ............. G06F 3/03543
                                                    345/163
2015/0077352 A1* 3/2015 Ma ..................... G06F 3/03547
                                                    345/173

OTHER PUBLICATIONS

"Windows Touch Gestures Overview.pdf"; extracted from website https://web.archive.org/web/20151121192051/https://msdn.microsoft.com/en-us/library/windows/desktop/dd940543(v=vs.85).aspx Published Nov. 21, 2015.*

"Making the mouse left-handed in Windows 7.pdf"; extracted from website https://web.archive.org/web/20130304035512/http://www.bbc.co.uk/accessibility/guides/mouse_easier/left_handed/win/win7/index.shtml#textversion Published Mar. 4, 2013.*

CN103472931A Diagrams Espacenet.pdf Machine English translation version of Chinese Patent Application "CN 103472931 A" from Espacenet, published Dec. 25, 2013. Inventor: Chen, Guanting et. al.*

* cited by examiner

USING A HARDWARE MOUSE TO OPERATE A LOCAL APPLICATION RUNNING ON A MOBILE DEVICE

BACKGROUND

A conventional electronic tablet enables its owner to access content via its touchscreen. In particular, the touchscreen simultaneously displays graphical content and receives touch input in the form of finger gestures (i.e., the tablet owner touches locations which are over the displayed graphical content). In response to this touch input, the electronic tablet may perform particular operations.

Typically, the tablet owner holds the electronic tablet in one hand so that the touchscreen faces the owner, and enters the finger gestures on the touchscreen using the other hand. Examples of finger gestures include a single finger tap, a double finger tap, a single finger swipe, a two finger swipe, a pinch-in gesture (two fingers moving towards each other), and a pinch-out gesture (two fingers moving away from each other).

SUMMARY

Unfortunately, there are deficiencies to this above-described conventional approach to using a touchscreen of an electronic tablet. For example, suppose that the electronic tablet is being used in a desktop setting, i.e., the electronic tablet is supported upright on a stand and is connected to a hardware keyboard. In such a situation, it may be inconvenient and uncomfortable for the owner to lean forward and raise his/her arm from the hardware keyboard to provide finger gestures on the touchscreen. Moreover, for some tablet apps, there are small touch areas which are difficult to precisely select particularly if the owner has large fingers.

Additionally, suppose that the conventional electronic tablet runs a local application and is being used with an external display (e.g., a conventional desktop monitor). In such a situation, the owner of the electronic tablet is not able to directly interact with the external display (e.g., it is not possible for the owner to enter finger gestures on the external display to control the local application). Rather, the owner is still forced to look away from the external display and look at the touchscreen of the electronic tablet in order to find touchscreen locations and enter various types of user input (e.g., to click on a button on the touchscreen).

Furthermore, suppose that the owner wishes to play games on the electronic tablet. Unfortunately, touch interactions can be limiting in how well the owner can control some games compared to when the owner uses a game controller such as an electronic mouse on a personal computer.

In contrast to the above-described conventional approach to using a touchscreen of an electronic tablet, improved techniques are directed to using a hardware mouse to operate a local application running on a mobile device. Such use of the hardware mouse improves the user experience by enabling the user to provide fuller, faster, and more precise control over the local application. For example, suppose that the mobile device is a tablet with a touchscreen. In such a situation, the user may prop up the tablet (e.g., on a stand) so that the user is able to view content from the local application thus eliminating the need for an external display. Additionally, the user may connect the hardware mouse to the tablet (e.g., via a cable, via wireless communications, etc.) thus enabling the user to robustly and reliably control the local application via the hardware mouse (e.g., by moving the mouse over a flat surface, clicking on right/left mouse buttons, scrolling a mouse wheel, etc.). Furthermore, the user may further use a hardware keyboard thus enabling the user to operate the mobile device in a manner similar to that of controlling a conventional desktop computer. Moreover, if the user chooses to use an external monitor, the user does not need to look away from the external monitor to the mobile device, but instead may view a pointer on the external monitor while manually operating the hardware mouse.

One embodiment is directed to a method of operating a local application running on a mobile device (e.g., a smart phone, a tablet, a personal digital assistant, etc.). The method includes receiving, by processing circuitry of the mobile device, native mouse input from a hardware mouse communicating with the mobile device. The native mouse input is received in response to user operation of the hardware mouse. The method further includes translating, by the processing circuitry, the native mouse input into translated touchscreen input. The method further includes providing, by the processing circuitry, the translated touchscreen input to the local application running on the mobile device to control operation of the local application. With the availability of such a hardware mouse, the mobile device is better suited for running local applications (or simply apps) that may require precise user input such as spreadsheets, computer-aided design (CAD) tools, games, and so on.

In some arrangements, the method further includes, in response to providing the translated touchscreen input to the local application, rendering visual output from the local application. Along these lines, the user is able to modify displayed content on the touchscreen, e.g., precisely select spreadsheet cells, navigate a filesystem, etc. In particular, the user is able to click on buttons/links/objects/etc., scroll up/down/left/right, zoom in/out, select text/objects/etc., drag and drop, and so on.

In some arrangements, the native mouse input includes a set of detected hardware mouse events. Here, translating the native mouse input into the translated touchscreen input includes generating, as the translated touchscreen input, a set of touchscreen events based on the set of detected hardware mouse events. Some of the hardware mouse events are simply translated. Other hardware mouse events are processed and managed, e.g., result in generated interface control events. Yet other hardware mouse events are processed and provided in application-friendly form (e.g., delegated) directly to the local application.

Examples of touchscreen events that are provided to the local application include finger tap gestures (single tap, double tap, triple tap, etc.), finger swipe gestures (one finger swipes, two finger swipes, etc.), and pinch gestures (pinch-in, pinch-out, etc.). Moreover, the user is able to continue to enter input into the actual touchscreen of the mobile device, and the local application is still able to process real touchscreen input.

In some arrangements, the touchscreen displays and moves a mouse pointer while the set of touchscreen events are generated based on the set of detected hardware mouse events. In certain arrangements, the mobile device is able to move one local application out of focus and another local application into focus on the touchscreen while the user continues to operate the hardware mouse and provide mouse input to the local applications.

In some arrangements, the local application is a previously released mobile app wrapped with hardware mouse support code which provides hardware mouse control over the local application. Here, before the mobile app is conveyed to the mobile device, the mobile app is provisioned with enhanced functionality (i.e., framework code) to process native mouse input in a manner similar to that of processing touch screen events.

In some arrangements, the mobile device displays a hardware mouse graphical user interface (GUI) on the touchscreen to enable the user to customize operation of the hardware mouse (e.g., pointer size, mouse speed, lefthand/righthand control, etc.). Moreover, the user can customize mouse operation by entering input to the touchscreen directly or by operating the hardware mouse.

Another embodiment is directed to a computer program product having a non-transitory computer readable medium that stores a set of instructions to operate a local application running on a mobile device. The set of instructions, when carried out by the mobile device, causes the mobile device to perform a method of:

(A) receiving native mouse input from a hardware mouse communicating with the mobile device, the native mouse input being received in response to user operation of the hardware mouse;

(B) translating the native mouse input into translated touchscreen input; and (C) providing the translated touchscreen input to the local application running on the mobile device to control operation of the local application.

Yet another embodiment is directed to a mobile device which includes a hardware mouse interface, a touchscreen which (i) receives real touchscreen input in response to user touch input and (ii) displays user output, memory, and control circuitry coupled to the hardware mouse interface, the touchscreen, and the memory. The memory stores instructions that, when carried out by the control circuitry, cause the control circuitry to:

(A) receive native mouse input from a hardware mouse communicating with the hardware mouse interface, the native mouse input being received in response to user operation of the hardware mouse in lieu of user touch input via the touchscreen, (B) translate the native mouse input into translated touchscreen input, and (C) provide the translated touchscreen input to a local application running on the mobile device to control operation of the local application.

It should be understood that, in the cloud context, some electronic circuitry such as remote servers which are accessed by the mobile device may be formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in using a hardware mouse to operate a local application running on a mobile device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to using a hardware mouse to operate a local application running on a mobile device (e.g., a tablet device, a smart phone, a personal digital assistant, etc.). Such use of the hardware mouse improves the user experience by enabling the user to provide fuller, faster, and more precise control over the local application. For example, suppose that the mobile device is a tablet with a touchscreen. In such a situation, the user may prop up the tablet so that the user is able to view content from the local application thus eliminating the need for an external display. Additionally, the user may connect the hardware mouse to the tablet (e.g., via a cable, via wireless communications, etc.) thus enabling the user to robustly and reliably control the local application via the hardware mouse (e.g., by moving the mouse over a flat surface, clicking on right/left mouse buttons, scrolling a mouse wheel, etc.). Moreover, the user may further use a hardware keyboard thus enabling the user to operate the mobile device in a manner similar to that of controlling a conventional desktop computer.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
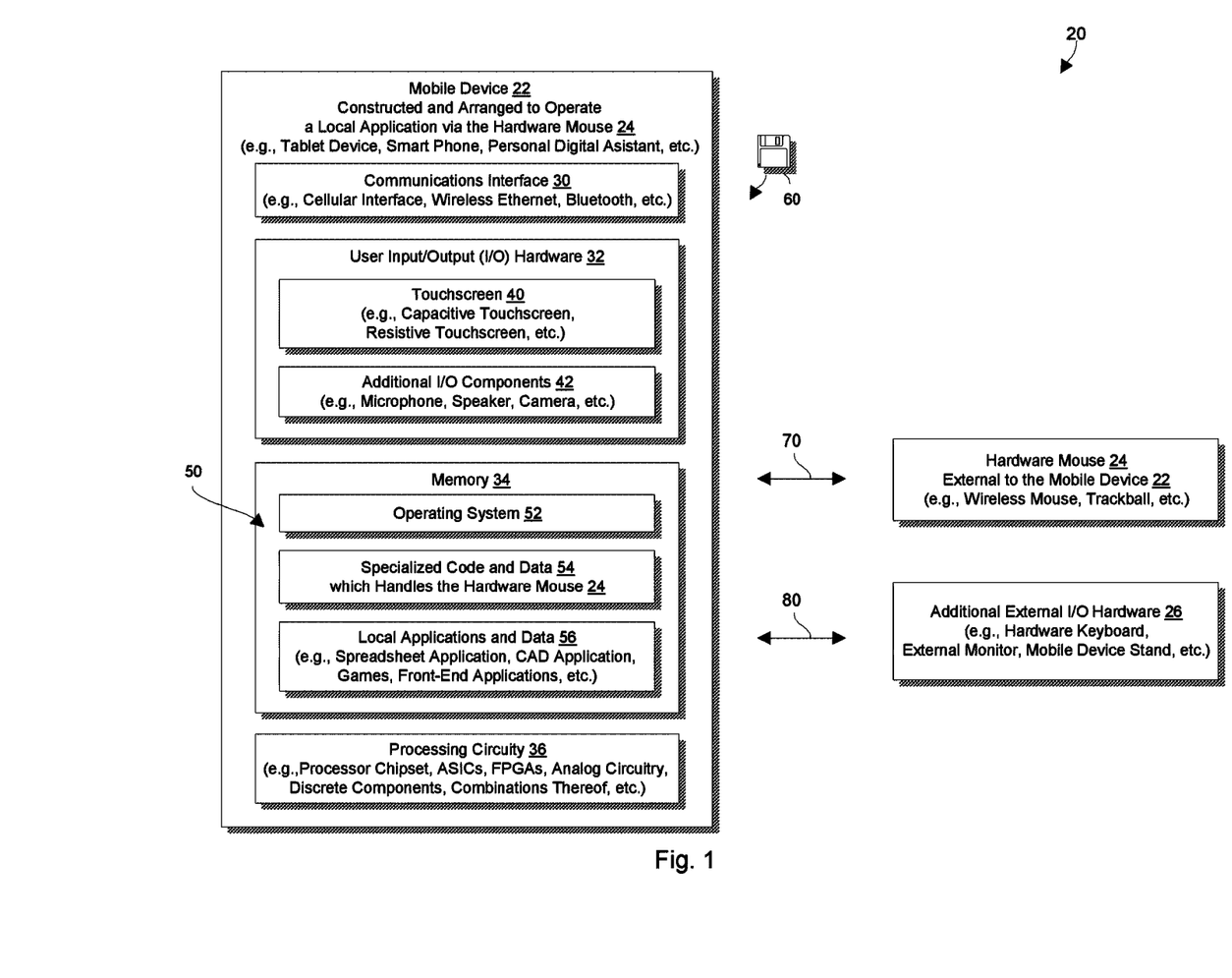
FIG. 1 is a block diagram of an electronic system that is provisioned with a hardware mouse to operate a local application.

FIG. 1 is a block diagram of an electronic system (or apparatus) 20 that is provisioned with a hardware mouse to operate a local application. The electronic system 20 includes a mobile device 22 (e.g., a tablet, a smart phone, a personal digital assistant, etc.), a hardware mouse 24, and perhaps additional external input/output hardware 26. The mobile device 22 includes a communications interface 30, user I/O hardware 32, memory 34, and processing circuitry 36.

The communications interface 30 is constructed and arranged to connect the mobile device 22 to various communications media such as a cellular network, a wireless router to a computer network, Bluetooth devices, and so on. Accordingly, the communications interface 30 enables communications with the other apparatus/devices. Such communications may be wireless or even line-based (e.g., radio frequency, fiber optic, infrared, via cables, combinations thereof, and so on).

The user I/O hardware 32 includes a touchscreen 40 and additional I/O components 42. In general, the touchscreen 40 (and perhaps the entire casing of the mobile device 22) has a relatively flat form factor and operates as both a visual display (i.e., outputs visual information to a user) and an input device (i.e., receives touch commands from the user). The additional I/O components 42 include I/O peripherals that are typical of a tablet or a smart phone such as a microphone, a speaker, a camera, one or more physical buttons, one or more light emitting diodes (LEDs), and so on.

The memory 34 is intended to represent both volatile storage and non-volatile storage (e.g., DRAM, SRAM, flash memory, EEPROM, etc.). The memory 34 stores a variety of software constructs 50 including an operating system 52, specialized code and data 54 which handles the hardware mouse 24, and local applications and data 56.

The processing circuitry 36 is constructed and arranged to operate in accordance with the various software constructs 50 stored in the memory 34. In particular, the processing circuitry 36, when executing the operating system 52, manages various resources of the mobile device 22 (e.g., memory allocation, processor cycles, hardware compatibility, etc.).

Additionally, the processing circuitry 36 operating in accordance with the specialized code and data 54 forms specialized control circuitry to process input from the hardware mouse 24. In particular, such specialized control circuitry conveys user input from the hardware mouse 24 to one or more local applications running on the mobile device 22. As will be described in further detail below, such operation may involve translating detected hardware mouse events into touchscreen input for use by one or more local applications running on the mobile device 22. Such operation may further involve conveying application-friendly processed mouse events to the local applications, relaying detected hardware mouse events to remote applications, and so on.

Furthermore, the processing circuitry 36 operating in accordance with the local applications and data 56 enables the user of the mobile device 22 to perform useful work. Examples of suitable local applications and data 56 include user-level applications such as a spreadsheet application, a CAD application, a file system navigation application, and so on. One should appreciate that there are many opportunities/use cases for a local application running on a mobile device 22 to receive high precise location input via a hardware mouse 24.

It should be understood that the above-mentioned processing circuitry 36 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the mobile device 22 (e.g., directly or perhaps through another device or peripheral component). The computer program product 60 has a non-transitory and non-volatile computer readable medium that stores a set of instructions to control one or more operations of the mobile device 22. Examples of suitable computer readable storage media include tangible articles of manufacture and apparatus that store instructions in a non-volatile manner such as flash memory, CD-ROM, disk memory, tape memory, and the like.

The hardware mouse 24 is external to the mobile device 22 and is constructed and arranged to exchange hardware mouse signals 70 with the mobile device 22. Such hardware mouse signals 70 may include mouse movement input, mouse button press input, scroll input, and so on. Such input is considered to be native mouse input since the source of the input is an actual mouse rather than a touchscreen. In some arrangements, the hardware mouse 24 is a three dimensional physical device which fits within the human hand to receive standard user input such as mouse clicks (e.g., button presses), scroll control (e.g., in response to operation of a scroll wheel), and directional control (e.g., in response to movement of the hardware mouse 24 over a surface).

The additional external I/O hardware 26 is also external to the mobile device 22 and exchanges additional electronic signals 80 to enhance the user's experience. The additional external I/O hardware 26 is optional. Examples include a hardware keyboard, an external monitor, a mobile device stand, external speakers, and so on.

It should be understood that the local applications and data 56 are configured to receive touchscreen input from both the real touchscreen 40, as well as a framework which processes input from the hardware mouse 24. As will be explained in further detail below, this framework is formed by the processing circuitry operating in accordance with the specialized code and data 54. Some of the local applications and data 56 may include native instructions (e.g., code written specifically for the applications) to receive the touchscreen input, and the specialized code and data 54 is later added via application wrapping. However, for other local applications and data 56, there is tighter integration with the specialized code and data 54 (e.g., via a software developer's kit or SDK). Example techniques for customizing applications are described in U.S. application Ser. No. 14/490,198, entitled "APPLICATION CUSTOMIZATION", the contents and teachings of which are hereby incorporated by reference in their entirety. Further details will now be provided with reference to FIG. 2.

Figure 2:
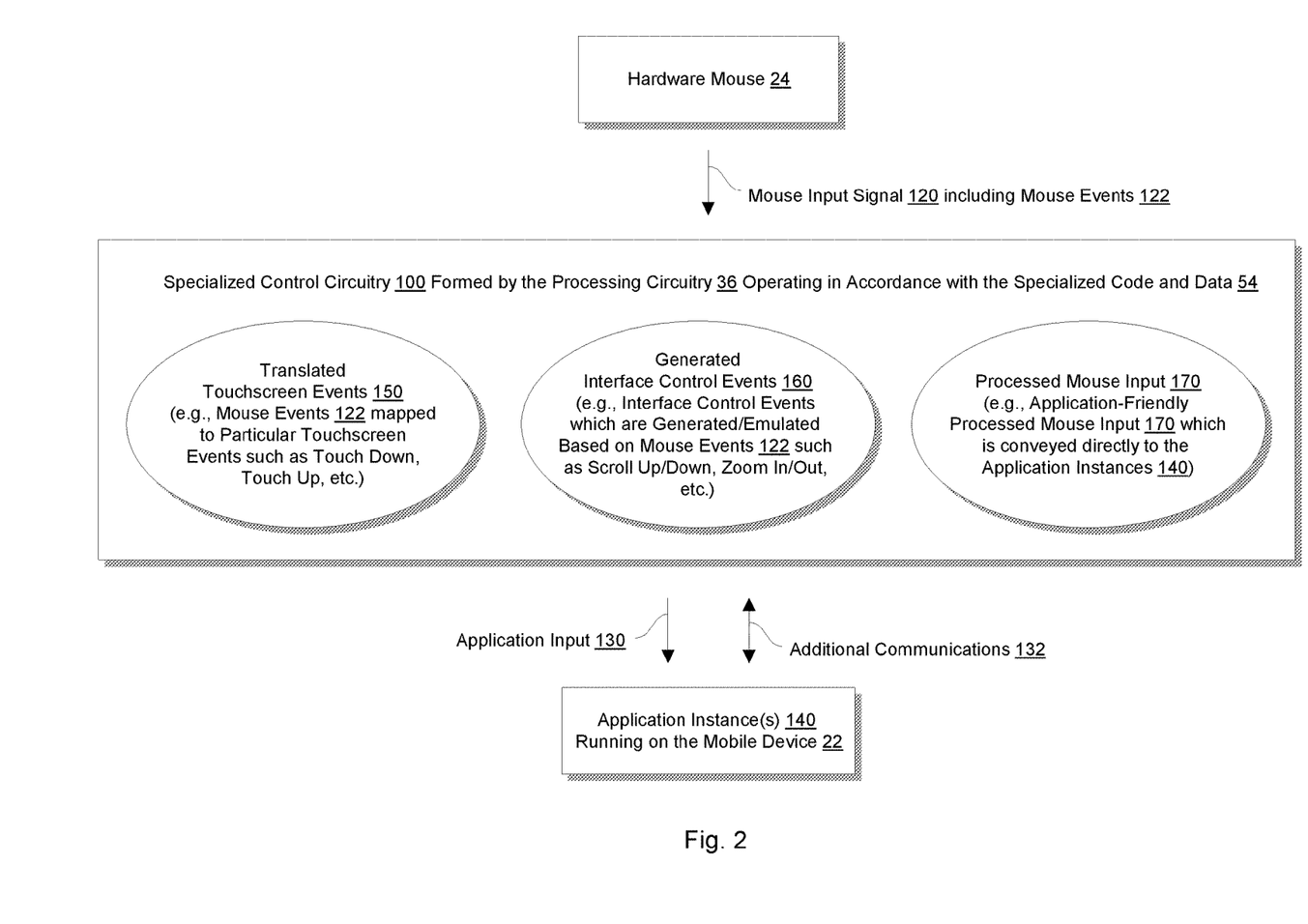
FIG. 2 is a block diagram illustrating various types of mouse input which is handled by specialized control circuitry of the electronic system of FIG. 1.

FIG. 2 is a block diagram illustrating various types of mouse input and how the mobile device 22, when operating in accordance with the specialized code and data 54, processes that mouse input based on a variety of criteria. As shown, the processing circuitry 36, when operating in accordance with the specialized code and data 54, forms specialized control circuitry 100 (also see FIG. 1).

The specialized control circuitry 100 receives a mouse input signal 120 from the hardware mouse 24. The mouse input signal 120 includes mouse events 122 such as mouse coordinates or directional displacement data, button input (e.g., button press, button release, etc.), scroll wheel input, and so on.

Additionally, the specialized control circuitry 100 provides application input 130 to one or more application instances 140 running locally on the mobile device 24 (also see the local applications and data 56 in FIG. 1). As mentioned earlier, such local application instances (or simply applications) 140 may be highly graphical such as a spreadsheet, a CAD tool, etc. requiring high precision input which may be difficult or even impractical for a touchscreen.

During such operation, it should be understood that additional communications 132 may take place between the specialized control circuitry 100 and the locally running application 140 enabling the specialized control circuitry 100 to determine how to process native mouse input. In particular, the mouse events 122 include mouse coordinate information (e.g., X-Y locations) and, via the communications 132 with the application 140, the specialized control circuitry 100 is able to determine whether the mouse pointer is currently over a simple object (e.g., a button), scrollable content, zoomable content, and so on.

In some situations, the specialized control circuitry 100 translates (or maps) certain detected mouse events 122 into translated touchscreen events 150 and then provides the translated touchscreen events 150 to the applications 140. Along these lines, for a particular application 140, the specialized control circuitry 100 may detect a mouse button press followed by a mouse button release (e.g., when the user clicks and releases a mouse button). In response, the specialized control circuitry 100 simply translates the mouse button press to a touchscreen touch down event, and the mouse button release to a touchscreen touch up event. As a result, the application 140 receives and processes the touchscreen events in the same manner as if the user entered real finger touch events via the real touchscreen 40 (FIG. 1).

In other situations, the specialized control circuitry 100 processes (or manages) certain detected mouse events 122 into generated interface control events 160 and then provides the generated interface control events 160 to the applications 140. Along these lines, for a particular application 140, the specialized control circuitry 100 may process mouse wheel input (e.g., rotate forward or rotate reverse). In such a situation, the specialized control circuitry 100 then determines whether the pointer is currently over a window that contains scrollable content. If so, the specialized control circuitry 100 translates that set of mouse events into a series of interface control commands that effectuates scrolling of the content and provides the series of interface control commands to the application 140 for processing. Accordingly, the application 140 responds by scrolling the content (e.g., up or down depending on the direction of the mouse wheel input) in response to user operation of the hardware mouse 24. A similar operation may take place for a window containing zoomable content and in response to the user using the hardware mouse 24 to zoom in or zoom out.

In any of the above-described situations or in yet another situation, the specialized control circuitry 100 may pass certain detected mouse events 122 as application-friendly processed mouse input 170 to the applications 140. For example, for a particular application 140, the specialized control circuitry 100 may convey mouse movement input directly to a particular application 140 to reset an inactivity timer thus preventing the application 140 from entering a sleep mode, exiting the user, etc. As another example, the mouse pointer can be disabled and the mouse events 22 can be passed directly to a game application for further specialized processing of the application-friendly processed mouse input 170 in the context of the game application (e.g., aiming a weapon, etc.). Further details will now be provided with reference to FIG. 3.

Figure 3:
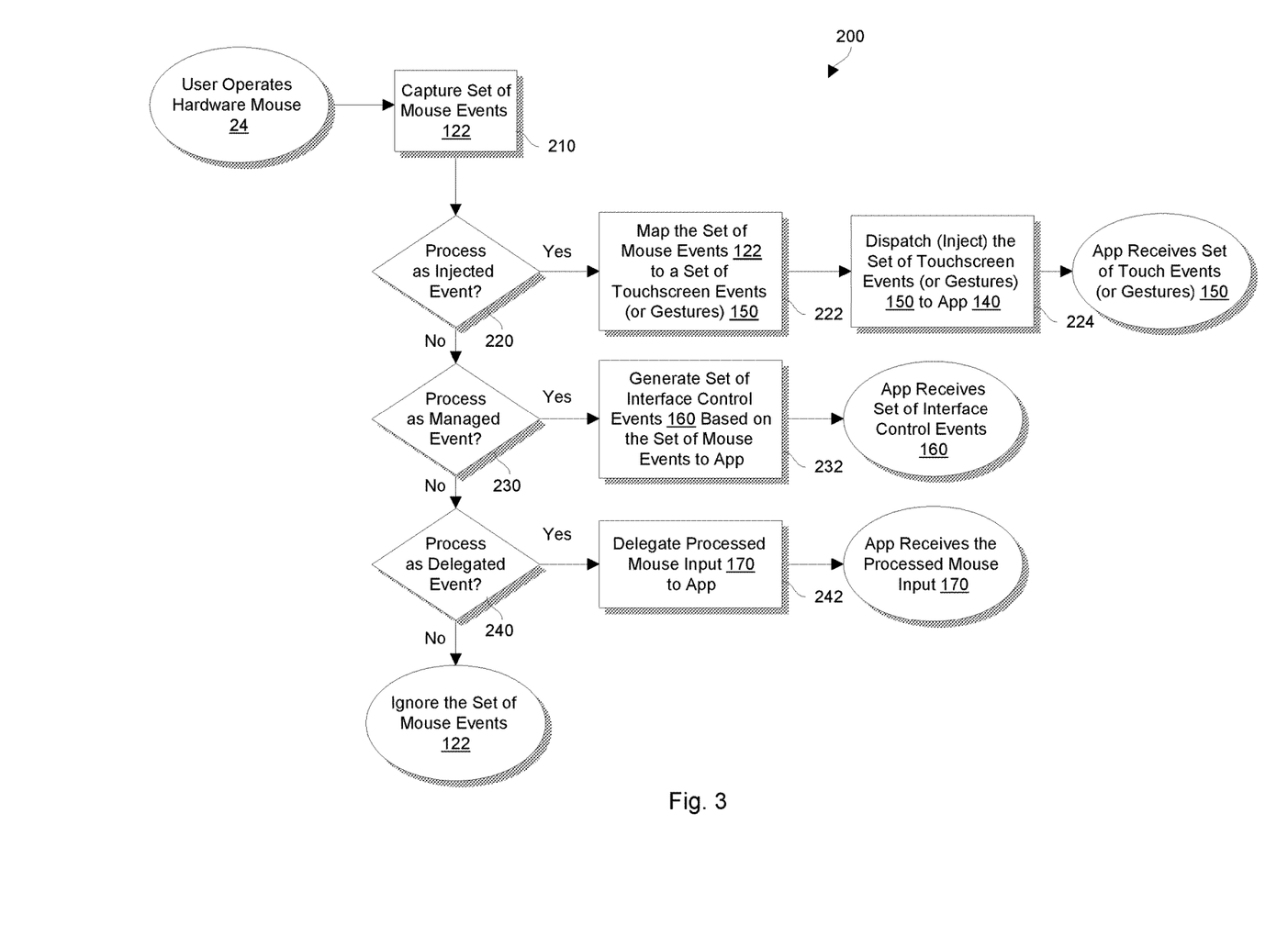
FIG. 3 is a block diagram showing particular operating details of the specialized control circuitry of the electronic system of FIG. 1.

FIG. 3 illustrates an example operational flow 200 of the specialized control circuitry 100 (also see FIG. 2). As shown, when a human user operates the hardware mouse 24, the specialized control circuitry 100 decides whether to (i) translate the mouse input into translated touchscreen events 150, (ii) generate interface control events 160 based on the mouse input, (iii) convey the mouse input directly to the applications 140, or (iv) ignore the mouse input.

In particular, at 210, the specialized control circuitry 100 initially captures a set of mouse events 122 in response to user operation of the hardware mouse 24. Next, at 220, the specialized control circuitry 100 decides whether to process the set of mouse events 122 as an injected event.

If the specialized control circuitry 100 decides to process the set of mouse events 122 as an injected event, the specialized control circuitry 100 maps the set of mouse events 122 to a set of touchscreen events (or gestures) 150, at 222. Then, at 224, the specialized control circuitry 100 dispatches the set of touchscreen events 150 to a locally running application 140. As a result, the application 140 receives the set of touchscreen events 150.

It should be understood that, at 220, the specialized control circuitry 100 may decide not to process the set of mouse events 122 as an injected event. In this situation, the specialized control circuitry 100 decides whether to process the set of mouse events 122 as a managed event at 230.

If the specialized control circuitry 100 decides to process the set of mouse events 122 as a managed event at 230, the specialized control circuitry 100 generates a set of interface control events 160 based on the set of mouse events 122, at 232. After the specialized control circuitry 100 has generated the set of interface control events 160 at 232, the application 140 receives the set of interface control events 160 for processing.

It should be understood that, at 230, the specialized control circuitry 100 may decide not to process the set of mouse events 122 as a managed (or processed) event. Here, the specialized control circuitry 100 decides whether to process the set of mouse events 122 as a delegated event at 240.

If the specialized control circuitry 100 decides to process the set of mouse events 122 as a delegate event 240, the specialized control circuitry 100 delegates application-friendly processed mouse input 170 to the application 140, at 242. After the specialized control circuitry 100 has delegated the application-friendly processed mouse input 170, the application 140 receives application-friendly processed mouse input 170 for further processing.

It should be understood that, at 240, the specialized control circuitry 100 may decide not to process the set of mouse events 122 as a delegated event. In this situation, the set of mouse events 122 are ignored.

It should be further understood that the operational flow 200 was provided for illustration purposes only and that other flows are suitable for use as well. For example, in a different use case such as the context of a game, the options of processing captured mouse events 122 as injected events or managed events (220, 230) may be disabled all together thus allowing the game to process only application-friendly processed mouse input 170. In yet another user case, the application 140 simultaneously processes injected/managed events 150/160 along with application-friendly processed mouse input 170 so that an inactivity timer of the application 140 is reset in response to mouse activity while the user operates the application 140. Other configurations are suitable for use as well. Further details will now be provided with reference to FIG. 4.

Figure 4:
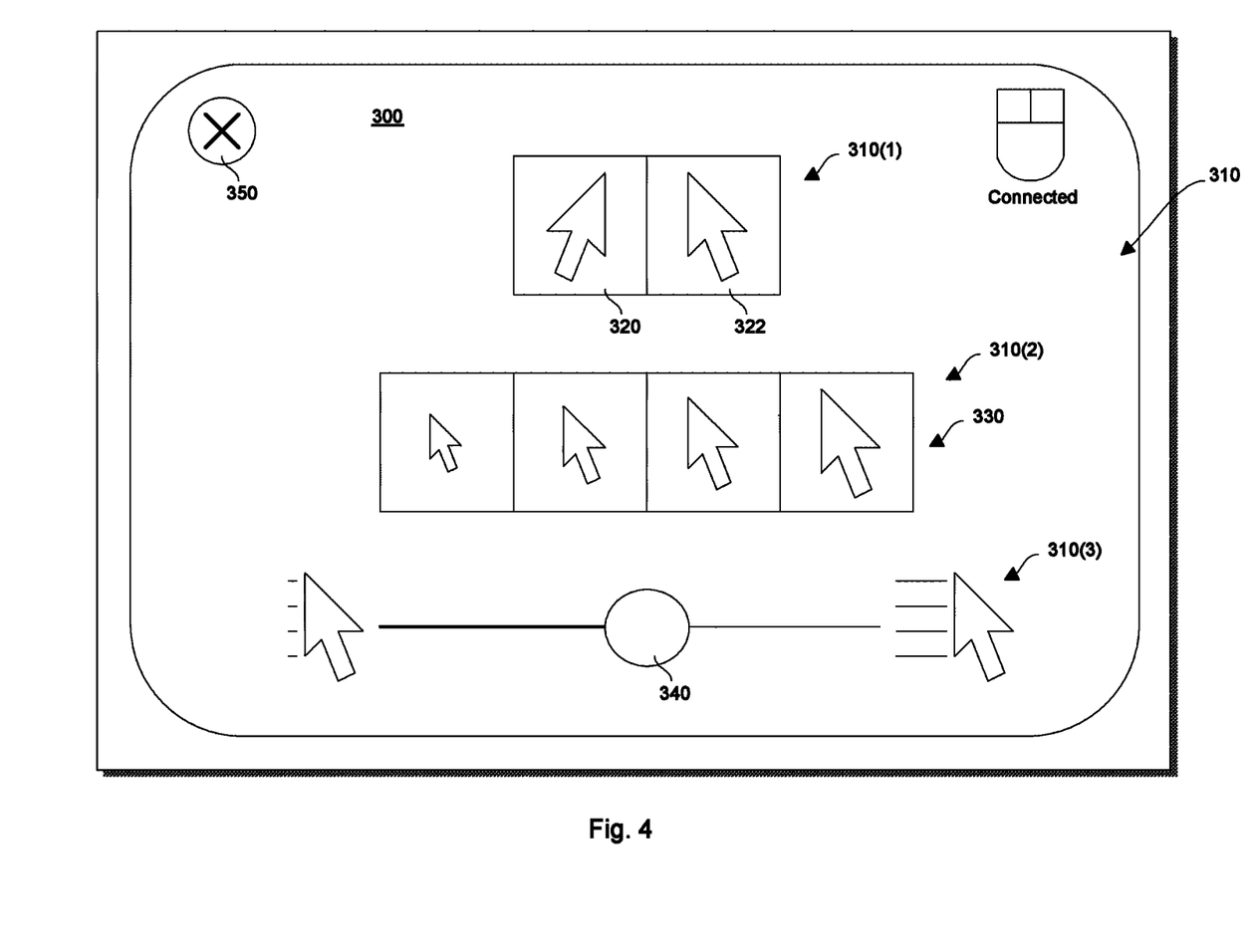
FIG. 4 is a block diagram of a graphical user interface of the electronic system that enables a user to customize operation of the hardware mouse.

FIG. 4 is a block diagram of an on-screen settings window of a graphical user interface (GUI) 300 of the electronic system 20 that enables a user to customize operation of the hardware mouse 24. The GUI 300 may be invoked/launched in a variety of different ways such as in response to detection of the hardware mouse 24 by the mobile device 22, by entering a special combination of mouse events 122, by activating a special icon or program on the mobile device 22, and so on.

As shown in FIG. 4, the window of the GUI 300 includes different sections 310(1), 310(2), and 310(3) for controlling different mouse aspects. The GUI 300 may include other control sections 310 as well (e.g., mouse connection status, controls to connect or disconnect the hardware mouse 24, etc.).

The section 310(1) of the GUI 300 allows the user to choose between a left-handed pointer or a right-handed pointer. In particular, if the user selects the button 320, the touchscreen 40 (and an external monitor if available, see additional external I/O hardware 26 in FIG. 1) displays a left-handed pointer. However, if the user selects the button 322, the touchscreen 40 (and the external monitor if available) displays a right-handed pointer.

The section 310(2) of the GUI 300 allows the user to control the size of the pointer. Although there are four different size selection buttons 330 offered by the GUI 300, a different number of size selection buttons 330 are suitable for use (e.g., two, three, five, and so on). Moreover, other styles of control are suitable for use as well such as a sliding horizontal scale, a sliding vertical scale, etc.

The section 310(3) of the GUI 300 allows the user to control the speed of the pointer. In particular, sliding a speed knob 340 to the left provides a slower moving pointer in response user movement of the hardware mouse 24. In contrast, sliding the speed knob 340 to the right provides a faster moving pointer in response user movement of the hardware mouse 24.

Other controls and status are suitable for including within the GUI 300 as well. For example, in some arrangements, the GUI 300 includes a section 310 that informs the user of the connection status of the hardware mouse 24. In some arrangements, the connection status is displayed in the same window as that shown in FIG. 4 (see upper right corner). In other arrangements, the connection status is displayed in a different window (e.g., in response to detected connection or disconnection of the hardware mouse 24).

Furthermore, if the user actuates the exit object 350, operation of the GUI 300 terminates. At that point, the GUI 300 disappears from the touchscreen 40 (and disappears on any external display) and the application 140 underneath is back in focus.

Additional Details

One should appreciate that the techniques disclosed herein enable a hardware mouse 24 to fully interface with and operate a mobile app on a mobile device 22 (e.g., a tablet, a smart phone, etc.). The techniques are further useful with tablets when used with a hardware keyboard in a desktop-like setting, or with productivity apps where the user interface includes many small touch areas, or any portable electronic device used with an external display where touch is not available, or with mobile games that can benefit from the use of a hardware mouse as a game controller providing the user with a fuller, faster and more precise control of the game.

Figure 5:
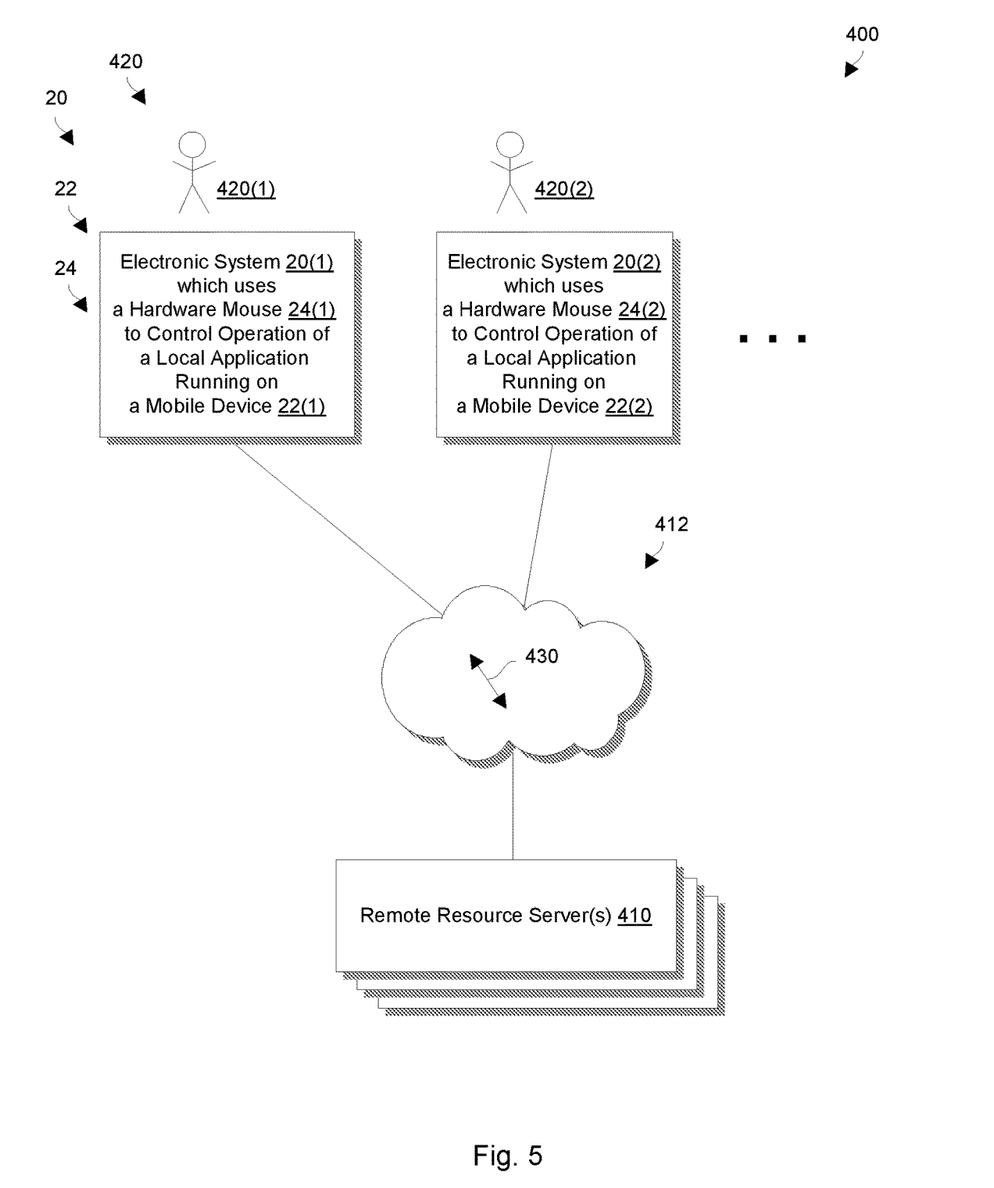
FIG. 5 is a block diagram of a computerized setting (or environment) that supports operation of the electronic apparatus of FIG. 1.

Additionally, the above-mentioned GUI 300 offers an on-screen settings window and connection status notifications that provide for a unique user experience (e.g., also see FIG. 5). The GUI 300 can uniquely overlay and blend with the application interface in a non-disruptive manner and without color or theme clashing. Furthermore, the GUI 300 the settings window can be invoked and controlled in a variety of ways including via use of the mouse buttons and wheel.

It should be understood that when conventional tablets are used in a desktop setting with a hardware keyboard attached or connected, it is not always easy or comfortable for the user to raise his/her arm to touch the touchscreen especially if a lot of touch input is required. Also, with some apps—especially productivity apps—using such apps with fingers while the conventional tablet is on a stand can be difficult or awkward, especially when are many small touch areas on the touchscreen or when user has large fingers. When the tablet's operating system does not provide native support for a mouse, it is difficult for a human to interact with some apps.

Additionally, when using a standard (non-touch) external display with a conventional tablet, it is not possible to interact with the app on the external display using touch events.

Furthermore, when playing certain games on a mobile device or tablet, touch interactions can be limiting in how well a human can control the game compared to when the human uses a game controller with console games or a mouse with games on a personal computer.

At least some of the improved techniques address these issues. Along these lines, a user is able to connect a hardware mouse 24 to a mobile device 22, e.g., using Bluetooth with a supported app on the mobile device 22. The user can position the hardware mouse 24 next to a hardware keyboard to interact with the app just like he/she would with a desktop computer. Additionally, the user can operate the hardware mouse 24 to interact with an app on an external display. Furthermore, the user can use the mouse to interact with a game like you would with a game on a personal computer.

As mentioned earlier, different detected mouse events 110 can be processed as different event groups.

1. Injected Events—These are events that map to specific touch and gesture events and are injected for the running application to receive.
   a. Mouse events 122 are captured by the specialized control circuitry 100.
   b. Mouse events 122 are translated to touchscreen events and gestures 150 (see Event Translation below).
   c. Touchscreen events and gestures 150 are sent/injected to the locally running application 140.
   d. A supported app receives these touchscreen events and gestures 150 as if they were normal touch events or gestures entered by the user onto a real touchscreen 40 of the mobile device 22 (also see FIG. 1).
2. Managed Events—These are events that are not injected for the locally running application 140 to receive but are managed and processed by the specialized control circuitry 100 to emulate built-in system functionality or other functionality.
   a. Rotating the mouse wheel of the hardware mouse 24 while the mouse pointer is over scrollable content causes the scrollable content to scroll up or down.
   b. Rotating the mouse wheel of the hardware mouse 24 while mouse pointer is over a slider control causes the slider to move and adjust its value.
   c. Clicking and simultaneously rotating the mouse wheel of the hardware mouse 24 while the mouse pointer is over zoom-able content causes the zoom-able content to zoom in or out. This, in effect emulates the pinch-to-zoom functionality (e.g., pinch-in, pinch-out, etc.).
   d. Clicking with the primary mouse button of the hardware mouse 24 on the mobile device 22 status bar causes any scrollable content in horizontal range of the mouse pointer to scroll to the top in the case of the operating system emulating the system functionality of the same.
3. Delegated Events—These are events that are not injected nor processed by the specialized control circuitry 100 and may or may not be related to the application user interface, but can be delegated to the locally running application for it to process. The mouse events 122 available for delegation are:
a. Mouse movement (absolute or relative)
b. Primary button press/release
c. Secondary button press/release
d. Wheel press/release
e. Wheel rotation Event delegation can be enabled throughout the locally running application 140 or for specific windows of the locally running application 140. Additionally, the locally running application 140 can choose to have some or all mouse events delegated. For example:
  a. Gaming API—a game can use delegated mouse events 170 to control the game (see Gaming API below) and disable all event injection and management.
  b. Application wrapper—specialized code added to an original application to utilize mouse input from a hardware mouse 24 may use some delegated mouse events 170 to renew an inactivity timer, while allowing all other events to be injected or managed.
  c. A remote desktop client may allow for event injection and management for the client user interface, but disable event injection and management for its remote session window. Here, the remote desktop client takes the delegated mouse events 170 for that window and forwards them to the server session. Such forwarded events can be translated if needed to the remote session's coordinate system. In this use case, there is a hybrid approach where the app is enlightened to the mouse events and can decide how the events are treated, based on context. This is made possible because of the event delegation process.

Event Translation—Tracking and Continuity

The event translation portion of this process enables full app interaction using the hardware mouse 14. In particular, the locally running application receives events in response to the user operating the hardware mouse 24 in the same way the locally running application receives touchscreen input. It requires tracking of mouse button events from the button press to the button release and all mouse moves in between the press and the release events. This creates the event continuity necessary to achieve full and proper event translation from mouse events to touch and gesture events. This in turn allows for full app interaction matching the corresponding touch events, like:
  a. One-finger taps or double taps (or triple taps etc.), long presses, swipes and all one-finger gestures. These are driven by the primary mouse button.
  b. 3D touch is driven by the secondary button and corresponds to what is known in the desktop world as "right-clicking" to bring up a context menu.
  c. Some two-finger touch events are supported by pressing both the primary and secondary mouse buttons and include two-finger taps (or double taps etc), two-finger long presses and two-finger swipes. Other two-finger gestures are made possible via touchscreen event generation, for example pinch to zoom (see Managed Events which are generated and sent to the application).
  d. Multiple mice can also be used, with events from each mouse corresponding to separate touch events. This can include one user with a mouse in each hand, or two or more users collaborating. This may result in multi-touch gestures, or it may result in independent multi-touch events depending on the view settings, since the view may or may not have set up multi-touch gesture recognizer support.

Event Synchronization

Synchronization/arbitration of injected events with native touch events is added to avoid race conditions and allow injected events to work in conjunction with native touch events.

Mouse Related User Experience

1. The framework provides a mouse pointer (e.g., an arrow) above all other content on the screen and moves the mouse pointer as the user moves the hardware mouse 24. Accordingly, the user can target where the user wants to click. The mouse pointer can be turned off when not needed, e.g., when in gaming mode.
2. User can simultaneously click Left+Right+Wheel on the mouse to instruct the framework to display an on-screen settings window (also see FIG. 4) that overlays all other content, so the user can change mouse settings. The settings window can be disabled when not needed, e.g., when an application provides its own mouse settings interface. By way of example, settings/elements may include:
   a. Left-handed/Right-handed option
   b. Pointer Size option
   c. Pointer Tracking/Speed option
   d. Connection Status indicator
   e. Close button
   f. Other options, e.g., different pointer colors, different pointer shapes, etc.
3. The framework provides an on-screen connection status window that overlays all other content when it detects the mouse is connected or disconnected. Accordingly, the user is aware of the mouse connectivity status. The connection status windows can be disabled when not needed, e.g., when an application provides its own mouse connection status interface.

Delivery Methods

1. Application wrapping—Code for the framework is added to an original application that is initially not equipped to receive input from a hardware mouse 24 via an application wrapping process. The application wrapping process is controlled at the source (e.g., an online application store, an application server, etc.) by controlling the loading and unloading of the framework code based on policy.
2. Dynamic containerization—The framework code is added to the application as part of a containerization process. Here, the source controls the loading of the framework code. Alternatively, the framework can load itself via code injection.
3. Software developer's kit (SDK) mode—The framework code is compiled into a separate app which in turn initializes and loads the framework code via its published application programming interface (API). The framework code then handles the rest. In SDK mode, an app can choose to disable touch injection and/or event management for some or all of its windows and instead choose to have some or all mouse events delegated for it to process.

Gaming API

It should be understood that games can use the framework in SDK mode and choose to have some or all mouse events delegated to them and enable a Relative Mouse Movement mode. When in this mode, the mouse pointer is not shown. Rather, the games can use the mouse movement events to do things like rotate the camera angle or turn the steering wheel on a car and use button press events for accelerating, breaking or in the case of a shooter game firing or throwing grenades, and so on.

For example, in a shooter game, the game can use relative mouse movements to turn the camera left/right and up/down, right button events to fire and repeat fire (when button is held down), left mouse button events to walk forward and mouse click events to walk backward, etc. As another example, the shooter game can use input from the mouse wheel for scrolling to select from a list of available weapons. Other scenarios exist which enable use of the hardware mouse 24 to play the game in order to give the user more control of the game.

Local Injection of Server Mouse Events

Another use-case involves using the mobile device 22 in a desktop context. In this situation, a hardware keyboard and a hardware mouse are bound to the mobile device 22 (e.g., via Bluetooth). Accordingly, the hardware mouse sends mouse events to the mobile device 22 in response to user operation. The mobile device 22 then processes the mouse events via the framework as described above.

Further Details

FIG. 5 is a block diagram of a computerized setting (or environment) 400 that supports operation of one or more electronic systems 20. The computerized setting 400 includes electronic systems 20(1), 20(2), . . . , one or more remote resource servers 410, and a communications medium 412.

As mentioned earlier, each electronic system 20 includes a mobile device 22 and a hardware mouse 24, and operates in response input from a user 420. That is, the electronic system 20(1) includes a mobile device 22(1) and a hardware mouse 24(1), and operates in response to input from a user 420(1). Likewise, the electronic system 20(2) includes a mobile device 22(2) and a hardware mouse 24(2), and operates in response to input from a user 420(2), and so on.

The remote resource servers 410 are constructed and arranged to provide the users 420 with access to remote resources. Examples of suitable remote resources include remote desktops, remote applications, remote virtual machines and virtualization platforms, and so on. In some arrangements, the users 420 are able to control remote resources (e.g., remote desktops, remote applications, etc.) in a manner similar to that of controlling local applications 140 as described above.

The communications medium 412 is constructed and arranged to connect the various components of the computerized setting 20 together to enable these components to exchange electronic signals 430 (e.g., see the double arrow 430). At least a portion of the communications medium 412 is illustrated as a cloud to indicate that the communications medium 412 is capable of having a variety of different topologies including backbone, hub-and-spoke, loop, irregular, combinations thereof, and so on. Along these lines, the communications medium 412 may include copper-based data communications devices and cabling, fiber optic devices and cabling, wireless devices, combinations thereof, etc. Furthermore, the communications medium 412 is capable of supporting LAN-based communications, cellular communications, plain old telephone service (POTS) communications, combinations thereof, and so on.

It should be understood that the computerized setting 20 may include other devices as well such as standard desktop computers, standard tablets, standard smart phones, and so on. Advantageously, the electronic systems 20 allow the users 420 to control more complex application such as local spreadsheet programs, local CAD tools, etc. which require fine user control and which are not practical for standard touchscreens. Further details will now be provided with reference to FIG. 6.

Figure 6:
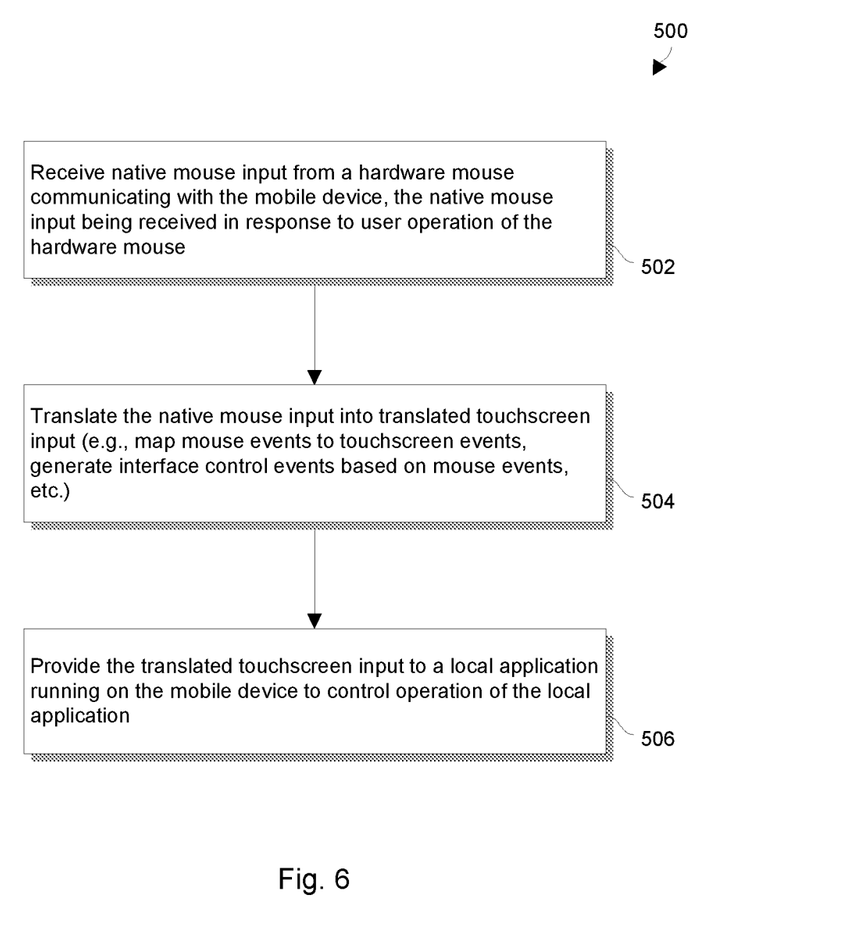
FIG. 6 is a flowchart of a procedure that is performed by the electronic system of FIG. 1.

FIG. 6 is a flowchart of a procedure 500 that is performed by an electronic system 20. In particular, the procedure 50 operates a local application 140 running on a mobile device 22.

At 502, processing circuit of the mobile device 22 receives native mouse input from a hardware mouse communicating with the mobile device. The native mouse input is received in response to user operation of the hardware mouse.

At 504, the processing circuitry translates the native mouse input into translated touchscreen input. For example, based on factors such as the particular application and the particular mouse events, the processing circuitry may translate (or map) mouse events to touchscreen events or gestures. As another example, based on the factors, the processing circuitry may generate interface control events based on the mouse events.

At 506, the processing circuitry provides the translated touchscreen input to the local application running on the mobile device to control operation of the local application. In response, the local application may perform a variety of operations such as selecting an object or text, drawing a line or connecting multiple points, scrolling up or down, zooming in or out, etc. In some situations, the fact that the input was entered via a hardware mouse is transparent to the location application. That is, the local application simply receives and processes touchscreen input regardless of whether the touchscreen input came from a real touchscreen or the hardware mouse.

It should be understood that certain application-friendly processed mouse input can be conveyed concurrently to the local application as well. For example, the local application may receive application-friendly processed mouse input and, in response, reset an inactivity timer to prevent the local application from going to sleep, exiting, etc.

As described above, improved techniques are directed to using a hardware mouse 24 to operate a local application 140 running on a mobile device 22. Such use of the hardware mouse 24 improves the user experience by enabling the user 420 to provide fuller, faster, and more precise control over the local application 140. For example, suppose that the mobile device 24 is a tablet with a touchscreen. In such a situation, the user 420 may prop up the tablet (e.g., on a stand) so that the user is able to view content from the local application 140 thus eliminating the need for an external display. Additionally, the user 420 may connect the hardware mouse 24 to the tablet (e.g., via a cable, via wireless communications, etc.) thus enabling the user 420 to robustly and reliably control the local application 140 via the hardware mouse 24 (e.g., by moving the mouse 24 over a flat surface, clicking on right/left mouse buttons, scrolling a mouse wheel, etc.). Furthermore, the user 420 may further use a hardware keyboard thus enabling the user to operate the mobile device 22 in a manner similar to that of controlling a conventional desktop computer. Moreover, if the user 420 chooses to use an external monitor, the user does not need to look away from the external monitor to the mobile device, but instead may view a pointer on the external monitor while manually operating the hardware mouse 24.

Additionally, one should appreciate that the above-described techniques amount to more than simply operating an application using a mouse. Rather, the techniques involve evaluating mouse events to decide whether to map the mouse events to touchscreen events, whether to generate interface control events based on the mouse events, and/or whether to provide application-friendly processed mouse input to the application. Such operation provides an improvement to the technology of standard touchscreen control of mobile device applications.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computerized setting 20 (FIG. 5) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, it should be understood that the pointing device utilized by the mobile devices 22 was described above as a hardware mouse 24. The term hardware mouse 24 may refer to any standard type of pointing device such as a cabled or wireless mouse. The term hardware mouse 24 may also refer to other types of pointing devices such as trackballs, pointer buttons, joysticks, and so on.

Moreover, one should appreciate that the specialized code and data 54 may be tightly integrated with a local application 56 to the point that they form a single app running on the mobile device. In other arrangements, the specialized code and data 54 forms a specialized "front-end" to one or more applications receiving native mouse input on the "back-end". Such modifications and enhancements are intended to belong to various embodiments of the disclosure.

What is claimed is:

1. A method of operating a local application running on a mobile device, the method comprising:
   receiving, by processing circuitry of the mobile device, native mouse input from a hardware mouse communicating with the mobile device, the native mouse input being received in response to user operation of the hardware mouse;
   translating, by the processing circuitry, the native mouse input into translated touchscreen input;
   providing, by the processing circuitry, the translated touchscreen input to the local application running on the mobile device to control operation of the local application; and
   in response to providing the translated touchscreen input to the local application, rendering visual output from the local application;
wherein rendering visual output from the local application includes:
   modifying displayed content on a touchscreen of the mobile device;
wherein the native mouse input includes a set of detected hardware mouse events;
wherein translating the native mouse input into the translated touchscreen input includes:
   generating, as the translated touchscreen input, a set of touchscreen events based on the set of detected hardware mouse events;
wherein generating the set of touchscreen events includes:
   providing a finger tap gesture in response to a first set of detected hardware mouse events,
   providing a finger swipe gesture in response to a second set of detected hardware mouse events, and
   providing a two-finger gesture in response to a third set of detected hardware mouse events; and
wherein the method further comprises:
   detecting real touchscreen input via the touchscreen of the mobile device, and
   providing the real touchscreen input to the local application running on the mobile device to further control operation of the local application.

2. A method as in claim 1 wherein providing the touchscreen input to the local application running on the mobile device includes:
   sending, as at least a portion of the set of touchscreen events, a translated touchscreen gesture to the local application running on the mobile device, the translated touchscreen gesture being translated from a particular set of detected hardware mouse events.

3. A method as in claim 1 wherein providing the touchscreen input to the local application running on the mobile device includes:
   sending, as at least a portion of the set of touchscreen events, a generated interface control event to the local application running on the mobile device, the generated interface control event being generated from a particular set of detected hardware mouse events.

4. A method as in claim 1, further comprising:
   sending application-friendly processed mouse input to the local application in response to at least some of the detected hardware mouse events.

5. A method as in claim 1 wherein generating the set of touchscreen events further includes:
   providing a single touchscreen gesture in response to multiple detected hardware mouse events.

6. A method as in claim 1 wherein generating the set of touchscreen events further includes:
   providing multiple touchscreen gestures in response to a single detected hardware mouse event.

7. A method as in claim 1, further comprising:
   displaying and moving a mouse pointer on the touchscreen of the mobile device while the set of touchscreen events are generated based on the set of detected hardware mouse events.

8. A method as in claim 1, further comprising:
   prior to receiving the native mouse input from the hardware mouse, installing the local application on the mobile device, the local application being a previously released mobile app wrapped with hardware mouse support code which provides hardware mouse control over the local application.

9. A method as in claim 1, further comprising:
   prior to receiving the native mouse input from the hardware mouse, rendering a user interface on the touchscreen of the mobile device, and
   obtaining a set of mouse configuration commands via the touchscreen while the user interface is rendered on the touchscreen, the set of mouse configuration commands customizing operation of the hardware mouse.

10. A method as in claim 9, further comprising:
    obtaining a set of additional mouse configuration commands via the hardware mouse rather than the touchscreen while the user interface is rendered on the touchscreen, the set of additional mouse configuration commands further customizing operation of the hardware mouse.

11. A computer program product having a non-transitory computer readable medium that stores a set of instructions to operate a local application running on a mobile device; the set of instructions, when carried out by the mobile device, causing the mobile device to perform a method of:
   receiving native mouse input from a hardware mouse communicating with the mobile device, the native mouse input being received in response to user operation of the hardware mouse;
   translating the native mouse input into translated touchscreen input;
   providing the translated touchscreen input to the local application running on the mobile device to control operation of the local application; and
   in response to providing the translated touchscreen input to the local application, rendering visual output from the local application;
wherein rendering visual output from the local application includes:
   modifying displayed content on a touchscreen of the mobile device;
wherein the native mouse input includes a set of detected hardware mouse events;
wherein translating the native mouse input into the translated touchscreen input includes:
   generating, as the translated touchscreen input, a set of touchscreen events based on the set of detected hardware mouse events;
wherein generating the set of touchscreen events includes:
   providing a finger tap gesture in response to a first set of detected hardware mouse events,
   providing a finger swipe gesture in response to a second set of detected hardware mouse events, and
   providing a two-finger gesture in response to a third set of detected hardware mouse events; and
wherein the method further comprises:
   detecting real touchscreen input via the touchscreen of the mobile device, and
   providing the real touchscreen input to the local application running on the mobile device to further control operation of the local application.

12. A computer program product as in claim 11, further comprising:
   displaying and moving a mouse pointer on the touchscreen of the mobile device while the set of touchscreen events are generated based on the set of detected hardware mouse events.

13. A computer program product as in claim 11, further comprising:
   prior to receiving the native mouse input from the hardware mouse, installing the local application on the mobile device, the local application being a previously released mobile app wrapped with hardware mouse support code which provides hardware mouse control over the local application.

14. A computer program product as in claim 11, further comprising:
   prior to receiving the native mouse input from the hardware mouse, rendering a user interface on the touchscreen of the mobile device, and
   obtaining a set of mouse configuration commands via the touchscreen while the user interface is rendered on the touchscreen, the set of mouse configuration commands customizing operation of the hardware mouse.

15. A computer program product as in claim 14, further comprising:
   obtaining a set of additional mouse configuration commands via the hardware mouse rather than the touchscreen while the user interface is rendered on the touchscreen, the set of additional mouse configuration commands further customizing operation of the hardware mouse.

16. A mobile device, comprising:
   a hardware mouse interface;
   a touchscreen which (i) receives real touchscreen input in response to user touch input and (ii) displays user output;
   memory; and
   control circuitry coupled to the hardware mouse interface, the touchscreen, and the memory; the memory storing instructions that, when carried out by the control circuitry, cause the control circuitry to:
      receive native mouse input from a hardware mouse communicating with the hardware mouse interface, the native mouse input being received in response to user operation of the hardware mouse in lieu of user touch input via the touchscreen,
      translate the native mouse input into translated touchscreen input,
      provide the translated touchscreen input to a local application running on the mobile device to control operation of the local application; and
      in response to providing the translated touchscreen input to the local application, render visual output from the local application;
   wherein the control circuitry, when rendering visual output from the local application, is constructed and arranged to:
      modify displayed content on the touchscreen;
   wherein the native mouse input includes a set of detected hardware mouse events;
   wherein the control circuitry, when translating the native mouse input into the translated touchscreen input, is constructed and arranged to:
      generate, as the translated touchscreen input, a set of touchscreen events based on the set of detected hardware mouse events;
   wherein the control circuitry, when generating the set of touchscreen events, is constructed and arranged to:
      provide a finger tap gesture in response to a first set of detected hardware mouse events,
      provide a finger swipe gesture in response to a second set of detected hardware mouse events, and
      provide a two-finger gesture in response to a third set of detected hardware mouse events; and
   wherein the control circuitry is further constructed and arranged to:
      detect real touchscreen input via the touchscreen, and
      provide the real touchscreen input to the local application to further control operation of the local application.

17. A mobile device as in claim 16 wherein the control circuitry is further constructed and arranged to:
   display and move a mouse pointer on the touchscreen while the set of touchscreen events are generated based on the set of detected hardware mouse events.

18. A mobile device as in claim 16 wherein the control circuitry is further constructed and arranged to:
   prior to receiving the native mouse input from the hardware mouse, install the local application on the mobile device, the local application being a previously released mobile app wrapped with hardware mouse support code which provides hardware mouse control over the local application.

19. A mobile device as in claim 16 wherein the control circuitry is further constructed and arranged to:
prior to receiving the native mouse input from the hardware mouse, render a user interface on the touchscreen, and
obtain a set of mouse configuration commands via the touchscreen while the user interface is rendered on the touchscreen, the set of mouse configuration commands customizing operation of the hardware mouse.

20. A mobile device as in claim 19 wherein the control circuitry is further constructed and arranged to:
obtain a set of additional mouse configuration commands via the hardware mouse rather than the touchscreen while the user interface is rendered on the touchscreen, the set of additional mouse configuration commands further customizing operation of the hardware mouse.

* * * * *